United States Patent [19]

Staendeke

[11] 3,855,311

[45] Dec. 17, 1974

[54] PRODUCTION OF DIALKYLPHOSPHINES

[75] Inventor: Horst Staendeke, Bruehl, Germany

[73] Assignee: Hoechst Aktiengesellschaft, Frankfurt/Main, Germany

[22] Filed: Nov. 8, 1973

[21] Appl. No.: 413,850

[30] Foreign Application Priority Data

Nov. 11, 1972 Germany............................ 2255395

[52] U.S. Cl. .......................................... 260/606.5 P
[51] Int. Cl. ............................................... C07f 9/50
[58] Field of Search............................. 260/606.5 P

[56] References Cited
UNITED STATES PATENTS

| | | | |
|---|---|---|---|
| 3,099,690 | 7/1963 | Rauhut et al................. | 260/606.5 P |
| 3,352,925 | 11/1967 | Hamilton..................... | 260/606.5 P |
| 3,481,988 | 12/1969 | Wünsch et al............... | 260/606.5 P |
| 3,760,001 | 9/1973 | Staendeke.................... | 260/606.5 P |

*Primary Examiner*—Patrick P. Garvin
*Assistant Examiner*—A. P. Demers
*Attorney, Agent, or Firm*—Connolly and Hutz

[57] ABSTRACT

Production of dialkylphosphines. In a first step, a mixture of phosphorus and an alkyl halide is passed at 300 – 450°C over active carbon and the resulting gaseous reaction mixture is initially freed from trialkylphosphonium halide and unreacted phosphorus, and then freed from a homogeneous mixture comprised of a dialkylhalaogenophosphine/hydrogen halide-addition product and dialkylphosphonium halide. In a second step, the mixture is solvolyzed with an alcohol, a pH of at least 2 is established in the solvolyzed material, and dialkylphosphine is separated from the solution obtained.

18 Claims, 1 Drawing Figure

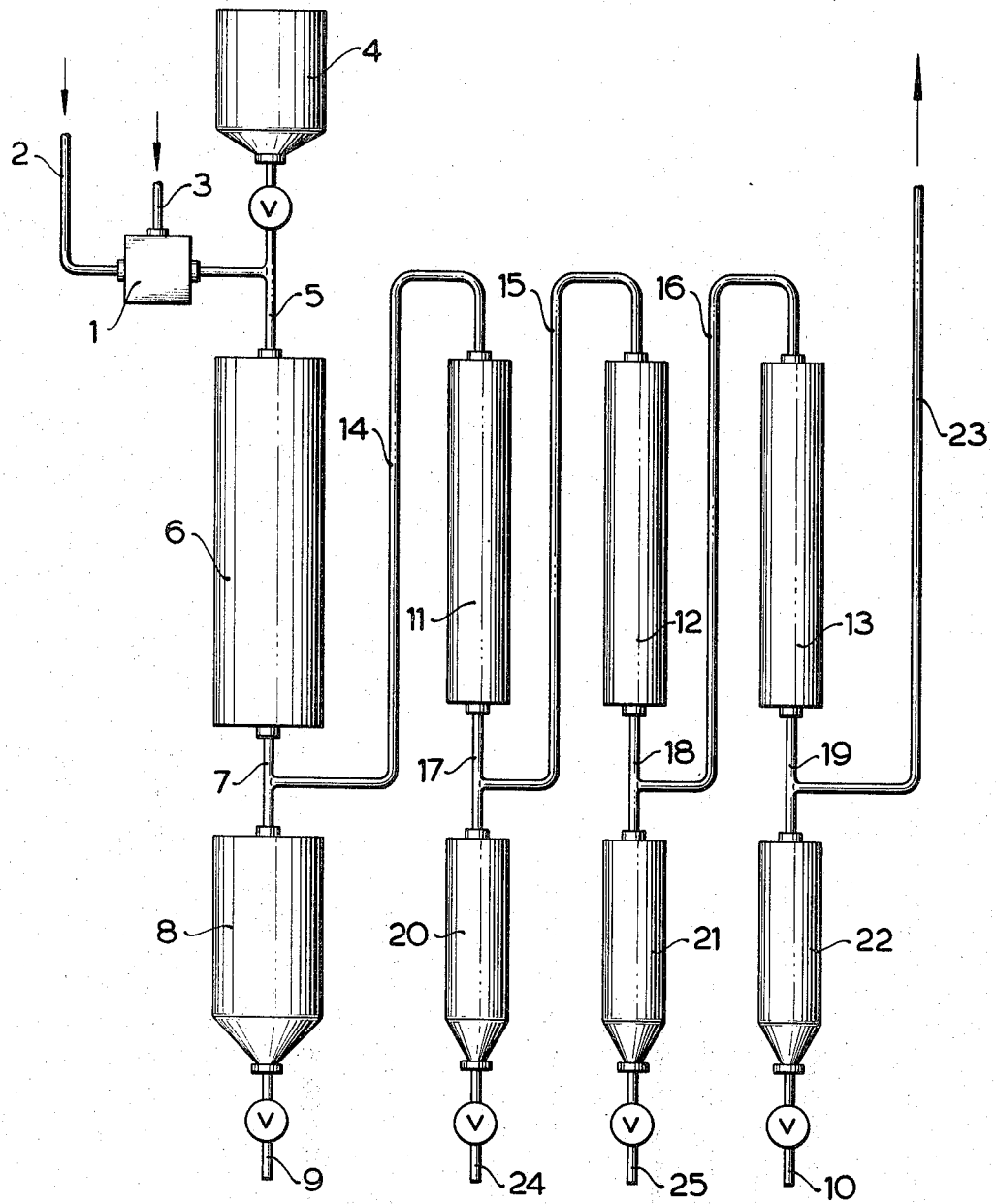

PRODUCTION OF DIALKYLPHOSPHINES

The present invention relates to a process for the manufacture of dialkylphosphines of the general formula $R_2PH$, in which each R stands for an alkyl group having from 1 to 3 carbon atoms.

Dialkylphosphines have been prepared heretofore by reducing dialkylhalogenophosphines $$4R_2PX + LiAlH_4 \rightarrow 4R_2PH + LiAlX_4$$

or derivatives of dialkylphosphinic or thiophosphinic acids $$4R_2P(O)X + 2LiAlH_4 \rightarrow 4R_2PH + LiAl(OH)_4 + LiAlX_4.$$

Further processes for making dialkylphosphines comprise reacting monoalkali metal alkylphosphides with alkylhalides $$RPHMe + RX \rightarrow R_2PH + MeX$$

or reducing tetraalkyldiphosphinesulfides, or disproportionating dialkylphosphine oxides $$2R_2P(O)H \xrightarrow{\Delta} R_2PH + R_2P(O)OH,$$

or additively combining hydrogen phosphide with olefins.

This latter reaction effects the additive combination of the phosphorus atom with the terminal double bond of the olefin. The reaction of $PH_3$ with an excess of ethylene is found exclusively to produce primary ethylphosphine, whereas the reaction of $PH_3$ with stoichiometric proportions of the olefin results in the formation of mixtures comprising primary, secondary and tertiary alkylphosphines. The mixture obtained by the reaction of stoichiometric proportions of $PH_3$ and 1-butene contains 38 % by volume of butylphosphine, 10 % by volume of dibutylphosphine and 2 % by volume of tributylphosphine, for example.

These earlier processes are, however, not fully satisfactory because they either produce insufficient yields of desirable phosphine, or dictate the use of costly starting materials, which are required to be produced in a plurality of steps.

In German Patent No. 1,122,522, it has been reported that hydrocarbon-substituted halogenophosphines can be made by reacting red phosphorus with a hydrocarbon halide at a temperature between 200°C and the sublimation temperature of phosphorus, in the presence of powdered copper as a catalyst. The resulting gaseous monoalkyl- and dialkylhalogenophosphines are condensed and separated from each other by fractional distillation.

Still further, it has been reported in German published Specification DOS 1,568,928 that phosphorus in gas or vapor form can be reacted with an alkyl chloride at a temperature between 300 and 400°C, for example, in the presence of an active carbon catalyst with the resultant formation — this in a manner analogous to that described in German Patent 1,122,522 — of alkylchlorophosphines together with unreacted phosphorus.

These two latter processes teach that the reaction of elementary phosphorus with alkyl halides at elevated temperature in the presence of certain catalysts always results in the formation of alkylhalogenophosphines. We have now unexpectedly discovered, however, that by the use of elementary phosphorus and alkyl halides in the presence of an active carbon catalyst and by the use of certain reaction conditions, it is also possible to produce dialkylphosphonium halides, which are easy to transform into dialkylphosphines.

The process of the present invention for the manufacture of dialkylphosphines of the general formula $R_2PH$, in which each R stands for an alkyl group having from 1 to 3 carbon atoms, comprises more particularly in a first step flowing a vaporous or gaseous mixture of phosphorus and an alkyl halide having from 1 to 3 carbon atoms in the alkyl radical by means of a carrier gas, in the absence of oxygen, and at a temperature between 300 and 450°C, over an active carbon catalyst; subjecting the resulting gaseous reaction mixture to fractional condensation so as to initially isolate trialkylphosphonium halide and unreacted phosphorus therefrom and thereafter to isolate a homogeneous mixture comprised of a dialkylhalogenophosphine/hydrogen halide addition product and dialkylphosphonium halide, and in a second step solvolyzing the said mixture with an alcohol with the resultant formation of dialkylphosphine oxide (from the dialkylhalogenophosphine-hydrogen halide addition product), the dialkylphosphonium halide remaining substantially unchanged; establishing in the solvolyzed material a pH-value of at least 2; and separating dialkylphosphine from the solution obtained.

A preferred feature of the process of the present invention comprises using as starting materials yellow phosphorus in vapor form and an alkyl halide selected from methyl chloride, methyl bromide or ethyl chloride. In order to enable the starting materials transformed into gas or vapor form to be passed at a satisfactory speed over the catalyst, it is good practice to use as the preferred carrier gas a hydrogen halide, in which chlorine or bromine is the halogen, or hydrogen, nitrogen, argon, or a suitable mixture thereof.

The gaseous starting materials of alkyl halide and phosphorus in vapor form should generally be used in a molar ratio between 0.5 : 1 and 3 : 1. The gas mixture including the carrier gas, which is passed over the catalyst, may contain up to 80 % by volume, preferably between 30 and 50 % by volume, of carrier gas. A gas mixture consisting approximately of 30 % by volume of alkyl halide, approximately 20 % by volume of phosphorus in vapor form and approximately 50 % by volume of carrier gas is particularly useful for practical operation.

Use should be made of a reaction temperature between 360 and 400°C so as to avoid partial decomposition of the resulting reaction product, and the reaction mixture should be contacted with the catalyst for a period between about 0.1 second and 30 minutes, preferably between about 10 seconds and 5 minutes, so as to ensure an optimum conversion rate for the starting materials in contact with the catalyst.

The gaseous reaction product should be condensed at approximately 100°C so as to initially remove trialkylphosphonium halide and unreacted phosphorus therefrom, and the residual gas should be further condensed at a temperature between −20°C and 50°C, preferably at approximately 20°C, so as to remove dialkylphosphonium halide together with the dialkylhalogenophosphine/hydrogen halide addition product therefrom. The residual gas so condensed and freed from the dialkylphosphonium halide/hydrogen halide-addition product can be subjected to still further stagewise condensation at temperatures lower than −20°C and monoalkyldihalogenophosphine and/or unreacted alkyl halide can be recovered therefrom, the latter being used again for reaction with phosphorus.

A still further preferred feature of the process of the present invention comprises improving the catalyst's efficiency by drying it at a temperature between about 350 and 360°C, preferably in the presence of a hydrogen halide, and this prior to using it. The use of a hydrogen halide as the carrier gas and the pretreatment of the catalyst therewith at elevated temperature has beneficial effects upon the yield of di- and trialkylphosphonium halides. It is therefore justified to believe that the hydrogen halide carrier gas does not act as an inert gas, but does favorably influence the course of the reaction.

The mixture comprised of the dialkylhalogenophosphine/hydrogen halide-addition product and dialkylphosphonium halide should conveniently be solvolyzed by introducing it, at a temperature between −70°C und +70°C und to the exclusion of oxygen, into an aliphatic alcohol having from 1 to 12 carbon atoms. An alcoholic solution is obtained in which a preferred pH between 6 and 8 should be established.

The dialkylphosphine can be separated from the solvolyzed material by distillation or phase separation or extraction.

The process of the present invention, which is the first to permit the manufacture of dialkylphosphine from elementary phosphorus and an alkyl halide via dialkylphosphonium halide, is a very desirable step forward in the art. In addition to this, the present process is a commercially attractive procedure, especially in those cases in which inexpensive yellow phosphorus is substituted for more costly red phosphorus, despite the relatively limited yields of dialkylphosphine. It should be noted however, that dialkylphosphine is obtained together with further reaction products including mono- and di-alkylhalogenophosphines and trimethylphosphine, which are also valuable intermediates of commercial interest, for example, in the production of detergents, flame-proofing agents and biocides. As compared with earlier methods, the present process is an uncomplicated procedure which can more particularly be carried out continuously.

Dialkylphosphines find widespread uses as intermediates in the production of trialkylphosphines, dialkylphosphine oxides and sulfides and dialkylphosphinic acids, which in turn find use as detergents, extractants, catalysts, flame-proofing agents and additives for lubricants.

The continuous first step operation by the process of the present invention will now be described with reference to the accompanying flow scheme. Needless to say the invention is not limited thereto.

A mixing device 1 is used to prepare a mixture of carrier gas and alkyl halide therein, the mixing components being introduced thereinto through lines 2 and 3. The mixture so made is delivered together with phosphorus, which is stored in a heated reservoir 4, to a heated tubular reactor 6, through line 5. Following evaporation of the phosphorus, the mixture undergoes reaction at temperatures between 300 and 450°C in contact with the active carbon catalyst. The gaseous reaction mixture coming from tubular reactor 6 is conveyed through line 7 to a steam-heated condenser 8, in which trialkylphosphonium halide is condensed together with unreacted phosphorus.

Fractions which remain uncondensed in condenser 8 are conveyed through feed lines 14, 15 and 16 to condensers 11, 12 and 13 placed one downstream of the other, liquefied therein and the resulting condensates are delivered to collectors 20, 21 and 22, respectively, which communicate with condensers 11, 12 and 13 through junction lines 17, 18 and 19. Collectors 20 and 21 receive the monoalkylhalogenophosphine or dialkylhalogenophosphine/hydrogen halide-addition product and dialkylphosphonium chloride respectively, whereas collector 22 receives unreacted alkyl halide. Uncondensed gaseous fractions of the reaction mixture, such as carrier gas and hydrogen — this latter originates from decomposition and secondary reactions — and lower olefins are removed through off-gas line 23. The products obtained in collectors 20, 21 and 22 are removed through lines 24, 25 and 10.

EXAMPLE

Nitrogen was introduced into an experimental apparatus to expel air therefrom and produce dimethylphosphine therein. Following this, the 2,000 grams of active carbon placed in tubular reactor 6 were dried at a temperature between 350 and 360°C, in the presence of hydrogen chloride. After the pre-treatment of the catalyst was terminated, 120 liters/hr of hydrogen chloride gas were mixed with 70 liters/hr of methyl chloride in mixer 1, and the resulting mixture was passed through tubular reactor 6, which had a temperature of 360°C. 160 Grams/hr of yellow phosphorus coming from reservoir 4 were simultaneously introduced into tubular reactor 6 and evaporated therein. The resulting phosphorus vapors in admixture with the hydrogen chloride and methyl chloride were passed over the active carbon catalyst and underwent reaction. The resulting hot reaction gases were cooled in steam-heated condenser 8 and trimethylphosphonium chloride together with unreacted phosphorus were condensed therein. Fractions of the reaction gas which remained uncondensed in condenser 8 were delivered to condensers 11, 12 and 13 and subjected to stagewise cooling therein down to temperatures of 20°C, −40°C and −80°C, respectively, and the resulting condensates were collected in collectors 20, 21 and 22, respectively. The experiment was arrested after 80 hours of operation. The products obtained were taken from the individual collectors and the yield was determined.

Condenser 8 contained 1.2 kg of crude trimethylphosphonium chloride. Collector 20 was found to contain 9 kg of a dimethylchlorophosphine/hydrogen chloride addition product and 1.3 kg phosphonium chloride, respectively. Collector 21 contained 9 kg of methyldichlorophosphine and collector 22 contained 2.6 kg of unreacted methyl chloride.

A 25 l container fitted with a heating means, agitator, fractionating column, dosing means, gas inlet and temperature and pH control means was scavenged with nitrogen to expel atmospheric oxygen, 8 l of methanol was introduced and cooled down to approximately 10°C with agitation. The material taken from collector 20 (dimethylchlorophosphine/hydrogen chloride-addition product and dimethylphosphonium chloride) was metered into the container within 6 hours and jointly with nitrogen, in which a reaction temperature lower than 30°C was maintained by cooling.

Methyl chloride formed by solvolysis was distilled off by heating to a temperature approximately of 70°C. Following this, the whole was cooled and a pH of 7 was established at a reaction temperature lower than 35°C by the addition of about 6 l of sodium hydroxide solution of 35 % strength. Dimethylphosphine (boiling range from 21 to 23°C) began distilling at a pH of approximately 2. The condensation gave 800 g of dimethylphosphine. This corresponded to a yield of 12 %, based on the methyl chloride, which underwent reaction.

Methylchlorophosphines and trimethylphosphonium chloride, which were further reaction products, were obtained in a yield of 83 %, equally based on the methyl chloride which underwent reaction.

I claim:

1. A process for the manufacture of dialkylphosphines of the general formula $R_2PH$, in which each R stands for an alkyl group having from 1 to 3 carbon atoms, comprising in a first step flowing a gaseous mixture of phosphorus and an alkyl halide having from 1 to 3 carbon atoms in the alkyl radical by means of a carrier gas, in the absence of oxygen and at a temperature between 300° and 450°C, over an active carbon catalyst; subjecting the resulting gaseous reaction mixture to fractional condensation so as to initially isolate trialkylphosphonium halide and unreacted phosphorus therefrom and thereafter to isolate a homogeneous mixture comprised of a dialkylhalogenophosphine/hydrogen halide-addition product and dialkylphosphonium halide, and in a second step solvolyzing the said mixture with an alcohol with the resultant formation of dialkylphosphine oxide (from the dialkylhalogenophosphinehydrogen halide addition product), the dialkylphosphonium halide remaining substantially unchanged; establishing in the solvolyzed material a pH-value of at least 2; and separating dialkylphosphine from the solution obtained.

2. The process as claimed in claim 1, wherein yellow phosphorus in vapor form is used.

3. The process as claimed in claim 1, wherein the alkyl halide is methyl chloride, methyl bromide or ethyl chloride.

4. The process as claimed in claim 1, wherein the carrier gas is a hydrogen halide, of which the halogen atom is chlorine or bromine, or hydrogen, nitrogen, argon or a suitable mixture thereof.

5. The process as claimed in claim 1, wherein the gaseous mixture of alkyl halide and phosphorus in vapor form passed over the catalyst contains the alkyl halide and the phosphorus in a molar ratio between 0.5 : 1 and 3 : 1.

6. The process as claimed in claim 1, wherein the gaseous mixture passed over the catalyst contains up to 80 % by volume of carrier gas.

7. The process as claimed in claim 1, wherein the gaseous mixture consists approximately of 30 % by volume of alkyl halide, approximately 20 % by volume of phosphorus in vapor form and approximately 50 % by volume of carrier gas.

8. The process as claimed in claim 1, wherein the reaction temperature is between 360 and 400°C.

9. The process as claimed in claim 1, wherein the gaseous mixture is contacted with the catalyst for a period between about 0.1 second and 30 minutes.

10. The process as claimed in claim 9, wherein the gaseous mixture is contacted with the catalyst for a period between about 10 seconds and 5 minutes.

11. The process as claimed in claim 1, wherein the gaseous reaction mixture is condensed at approximately 100°C so as to initially remove trialkylphosphonium halide and unreacted phosphorus therefrom, and the residual gas is further condensed at a temperature between −20 and 50°C, so as to remove dialkylphosphonium halide together with the dialkylhalogenophosphine/hydrogen halide addition product therefrom.

12. The process as claimed in claim 11, wherein the mixture of dialkylphosphonium halide and the dialkylhalogenophosphine/hydrogen halide-addition product is condensed at a temperature of about 20°C.

13. The process as claimed in claim 1, wherein the gas obtained after condensation of the dialkylphosphonium halide and the dialkylhalogeno-phosphine/hydrogen halide-addition product is subjected to stagewise condensation at temperatures lower than −20°C and monoalkyldihalogenophosphine and/or unreacted alkyl halide are recovered therefrom, the latter being used again for reaction with phosphorus.

14. The process as claimed in claim 1, wherein the catalyst is dried at temperatures between about 350° and 360°C, prior to using it.

15. The process as claimed in claim 14, wherein the catalyst is dried in the presence of hydrogen halide.

16. The process as claimed in claim 1, wherein the mixture comprised of the dialkylhalogenophosphine/hydrogen halide-addition product and dialkylphosphonium halide is solvolyzed by introducing it, at a temperature between −70°C and +70°C and to the exclusion of oxygen, into an aliphatic alcohol having from 1 to 12 carbon atoms.

17. The process as claimed in claim 1, wherein a pH between 6 and 8 is established in the alcoholic solution obtained on solvolyzing the mixture comprised of the dialkylhalogenophosphine/hydrogen halide-addition product and dialkylphosphonium halide.

18. The process as claimed in claim 1, wherein the dialkylphosphine is separated by distillation, phase separation or extraction.

* * * * *